(12) United States Patent
Fowler et al.

(10) Patent No.: US 6,669,226 B2
(45) Date of Patent: Dec. 30, 2003

(54) AIR BAG MODULE WITH OPPOSITELY ALIGNED INFLATORS

(75) Inventors: Todd D. Fowler, Shelby Township, MI (US); Brian C. Ford, Mt. Clemens, MI (US); Lawrence R. Langbeen, Attica, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 20 days.

(21) Appl. No.: 10/086,488

(22) Filed: Mar. 1, 2002

(65) Prior Publication Data

US 2003/0141703 A1 Jul. 31, 2003

Related U.S. Application Data

(60) Provisional application No. 60/352,659, filed on Jan. 29, 2002.

(51) Int. Cl.[7] .............................................. B60R 21/20
(52) U.S. Cl. .................. 280/728.2; 280/732; 280/743.2
(58) Field of Search ............................... 280/728.2, 732, 280/741, 743.1, 743.2

(56) References Cited

U.S. PATENT DOCUMENTS

| 4,153,273 | A | * | 5/1979 | Risko ....................... 280/728.2 |
| 5,209,510 | A | * | 5/1993 | Mamiya ....................... 280/732 |
| 5,992,875 | A | * | 11/1999 | Cundill ..................... 280/728.2 |
| 6,036,222 | A | * | 3/2000 | Holmes et al. .......... 280/728.2 |

FOREIGN PATENT DOCUMENTS

JP  11139241 A * 5/1999 ........... B60R/21/26

* cited by examiner

Primary Examiner—Peter C. English
(74) Attorney, Agent, or Firm—Markell Seitzman

(57) ABSTRACT

An air bag system comprising: a housing/inflator assembly and an air bag assembly operatively linked to the housing/inflator assembly to receive inflation gas to inflate an air bag of the air bag assembly, the housing/inflator assembly comprising: a plurality of inflators, each inflator including at least one exit port near a first end thereof, each inflator having a respective opposite second end, the housing/inflator assembly further including: a housing for mounting the inflators relative to one another with the at least one exit port of one of the inflator's positioned adjacent the second end of a second of the inflator's and with the second end of the first inflator adjacent the exit port of the second inflator.

14 Claims, 13 Drawing Sheets

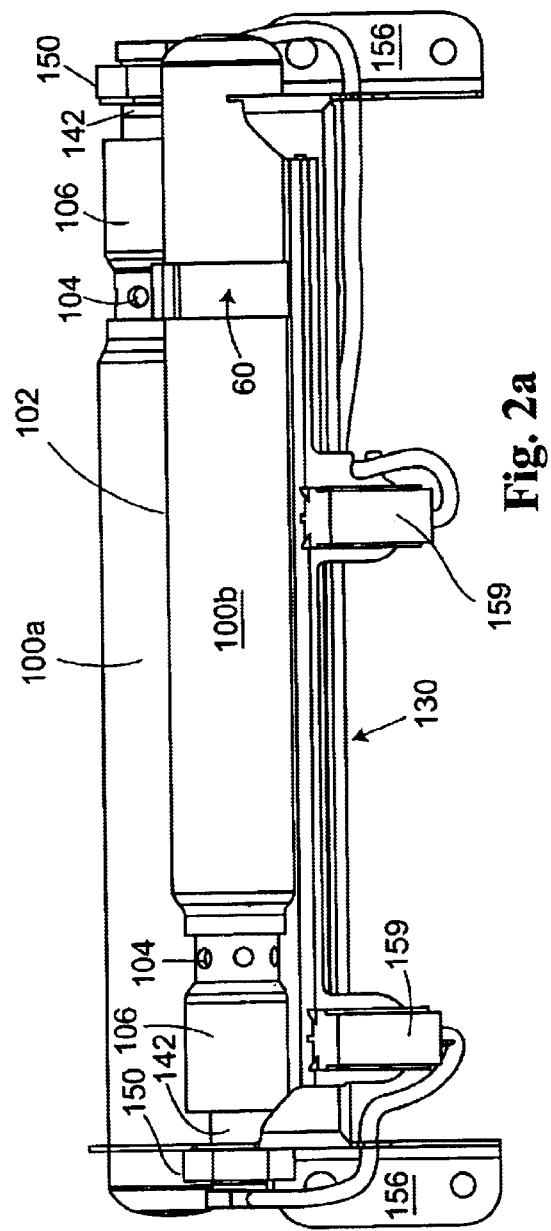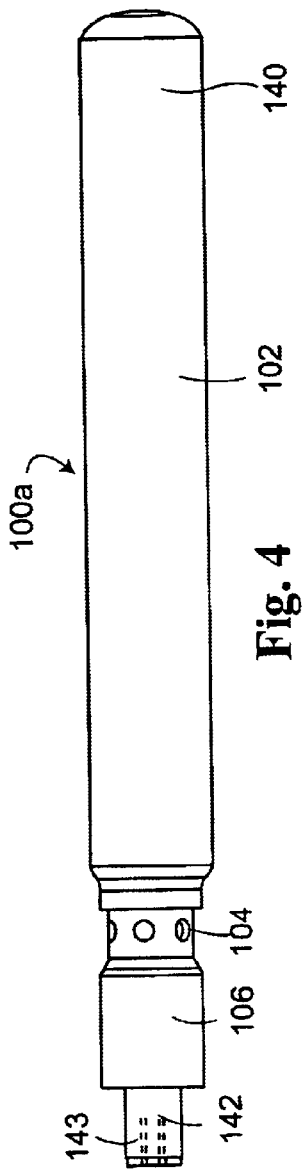
Fig. 2a
Fig. 4

AIR BAG MODULE WITH OPPOSITELY ALIGNED INFLATORS

This is a regularly filed utility patent application claiming priority of provisional patent application 60/352,659, filed Jan. 29, 2002.

BACKGROUND AND SUMMARY OF THE INVENTION

The present invention relates to an improved air bag module comprising a housing, two opposingly mounted cylindrical inflators and a cooperating air bag. Additionally, the air bag can accommodate a tether that is formed as part of a one-piece neck or throat portion.

Reference is briefly made to FIG. 1, which illustrates a prior art passenger air bag module 20 comprising a housing 22, manifold 24, cylindrical inflator 26 and air bag 28. The air bag includes an inflatable or cushion portion 30 and a neck portion 32. The inflator 26 includes a plurality of exit ports 34 located at one end of the inflator body 36. This construction is typical of hybrid inflators. In view of the asymmetry of the location of the exit ports, inflation gas flow is asymmetric, at least in relation to a longitudinal axis of the inflator. As known, a hybrid inflator includes a pressure chamber 38 for stored gas and will usually include one mounting fastener such as a threaded bolt-like fastener 40 at a remote end of the inflator. To achieve a more uniform distribution of the inflation gas, the inflator 26 can be received within a hollow diffuser 50 (also known as a manifold) which includes a plurality of more uniformly distributed exit ports 52, which span the width of the neck 32. The diffuser 50 includes a means for attaching it and the inflator to a support structure. This means may include fasteners 54, which extend through openings 56 in the housing 22. The housing and inflator are positioned within the neck portion 32 of the air bag 28 and are enveloped by a portion of the neck, which includes facing overlapping flaps 57. The air bag is folded (not shown) and secured about the inflator and manifold. A subassembly comprising the manifold, inflator and folded air bag is inserted within the open mouth of the housing 22.

It is an object of the present invention to provide an air bag module using asymmetrical flow inflators but where the resultant gas flow into the air bag is more uniform. Another object of the invention is to provide an improved air bag in which the neck portion includes a tether. In this embodiment the neck portion and the tether are made from a single piece of material.

Accordingly the invention comprises: An air bag system comprising: a housing/inflator assembly and an air bag assembly operatively linked to the housing/inflator assembly to receive inflation gas to inflate an air bag of the air bag assembly, the housing/inflator assembly comprising: a plurality of inflators, each inflator including at least one exit port near a first end thereof, each inflator having a respective opposite second end, the housing/inflator assembly further including: first means for mounting the inflators relative to one another with at least one exit port of one of the inflators positioned adjacent the second end of a second of the inflators and with the second end of the first inflator adjacent the exit port of the second inflator. Many other objects and purposes of the invention will be clear from the following detailed description of the drawings.

BRIEF DESCRIPTION OF THE DRAWINGS

FIG. 2a is a front view of the housing with inflators therein.

FIG. 4 shows an elongated inflator with exit ports at one end.

DETAILED DESCRIPTION OF THE DRAWINGS

Figure 1:
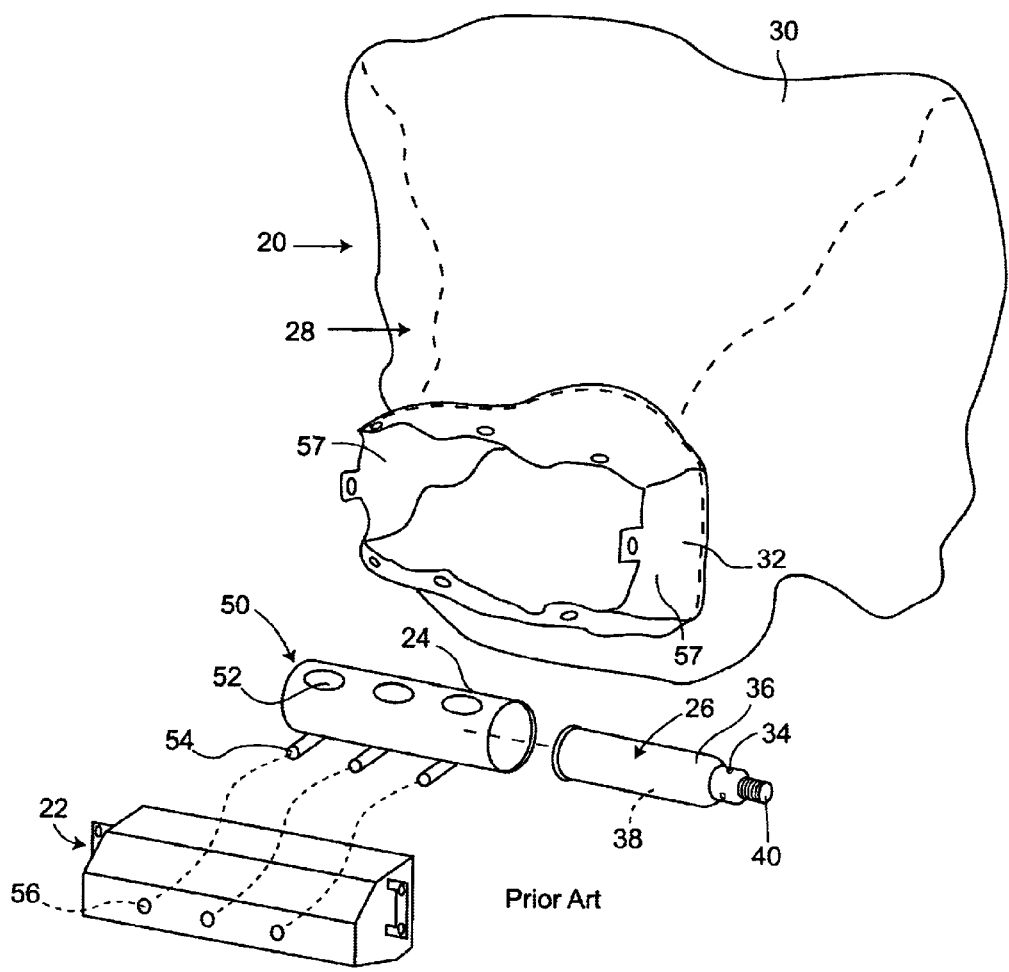
FIG. 1 shows a prior art passenger air bag arrangement.
Figure 2:
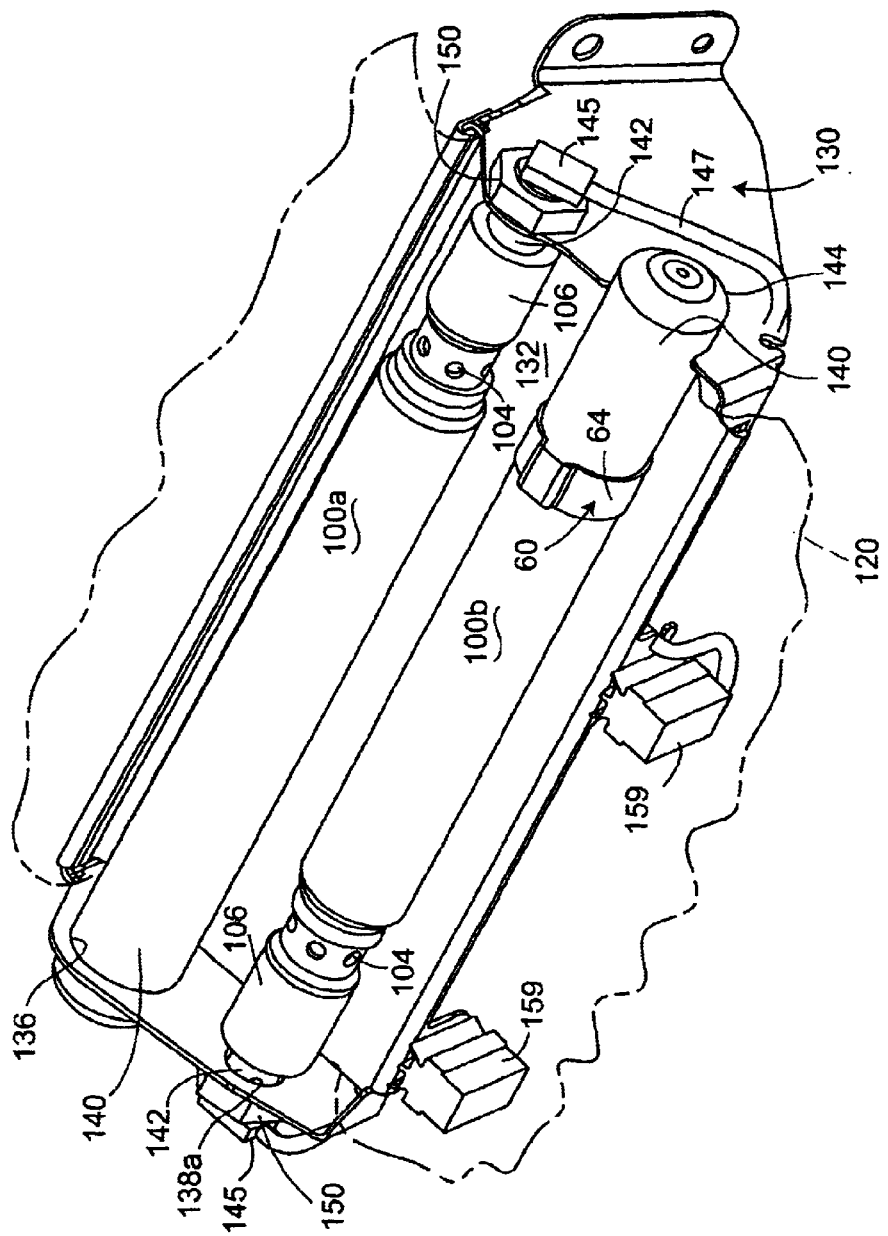
FIG. 2 illustrates two inflators lying side by side attached to a housing.

Reference is briefly made to FIG. 2, which shows two cylindrically shaped inflators 100a and 100b mounted to a simplified housing structure (housing) 130, which is described below. This housing 130 also functions as a reaction surface against which the inflating air bag reacts as it moves toward the passenger. In the present invention the inflators are first placed within an air bag and then the inflators (with the air bag) are secured to the housing. Only a small portion of an air bag 120 has been shown (by phantom line) in FIG. 2.

Figure 3:
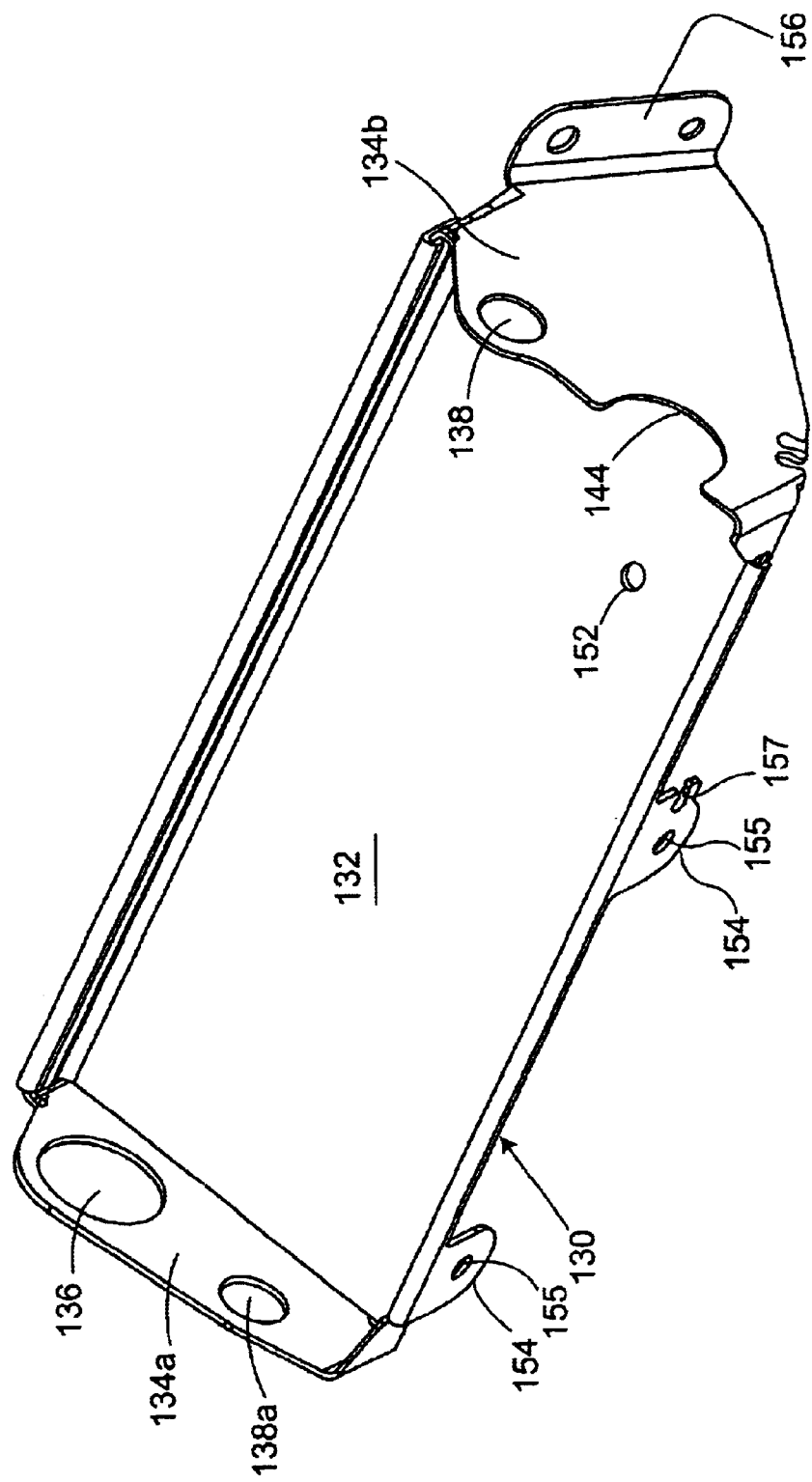
FIG. 3 is an isolated view of the housing.

Reference is briefly made to FIG. 3, which illustrates the details of the housing 130. The housing 130 generally includes a central plate 132 (which operates as the reaction surface) and two oppositely oriented inflator mounting flanges 134a and 134b. In the preferred embodiment the plate is flat but other shapes can be used. Flange 134a includes a first opening 136 sized to tightly and slidingly receive end 140 of inflator 100a while opposite flange 134b includes a narrower opening 138 sized to receive the narrow diameter threaded end 142 of inflator 100a. Flange 134a includes another small opening 138a sized to receive the threaded narrow diameter end 142 of Inflator 100b. However, flange 134b does not include another complete circular opening such as opening 136, but rather includes a notch 144 (a circular notch), which conforms to the shape of end 140 of inflator 100b. The large end 140 of inflator 100b rests in notch 144. The housing 130 includes tabs 154, which are used to install a wiring harness 159 in the correct location. The holes 155 are for wiring harness clips, and the slots 157 position the wires from the harness. Additionally, the housing may include side mounting flanges 156 (with mounting holes), only one of which is shown in FIG. 3. The other mounting flange extends similarly from flange 134a.

While circular openings and notches shown above comport with the circular-cylindrical shape of the inflator, the openings and notch can be other shapes as defined by the particular inflator. As can be seen in FIG. 2, the respective threaded ends 142 of each inflator are secured to the housing 130 by threaded fasteners such as nuts 150.

The housing 130 additionally includes a narrow mounting opening 152 to receive the fastener 62 portion of the clamp 60, which is used to secure inflator 100b. As described below the clamp 60 (see FIG. 5) is received about the body 102 of inflator 100b.

FIG. 4 shows the exterior of one of the inflators such as 100a. As is typical of the construction of a hybrid inflator, the body 102 of the inflator forms a pressure vessel. A plurality of exit ports 104 are located remote from the pressure vessel (within body 102). While not shown, the pressure vessel is sealed, as known in the art, by a burst disk (not shown). A burst disk can be opened by a variety of known mechanisms, which will often include an energetics portion 106. This energetics portion 106 includes a quantity of a chemical propellant and a primer or igniter (each of known construction) to ignite the propellant. When the propellant is activated, it provides a flame front or pressure wave sufficient to break, melt or burst the burst disk causing the release of compressed gas stored in the pressure vessel. Continued heating of the gas by the burning propellant raises the temperature of the gas as it enters the air bag 120.

Figure 6:
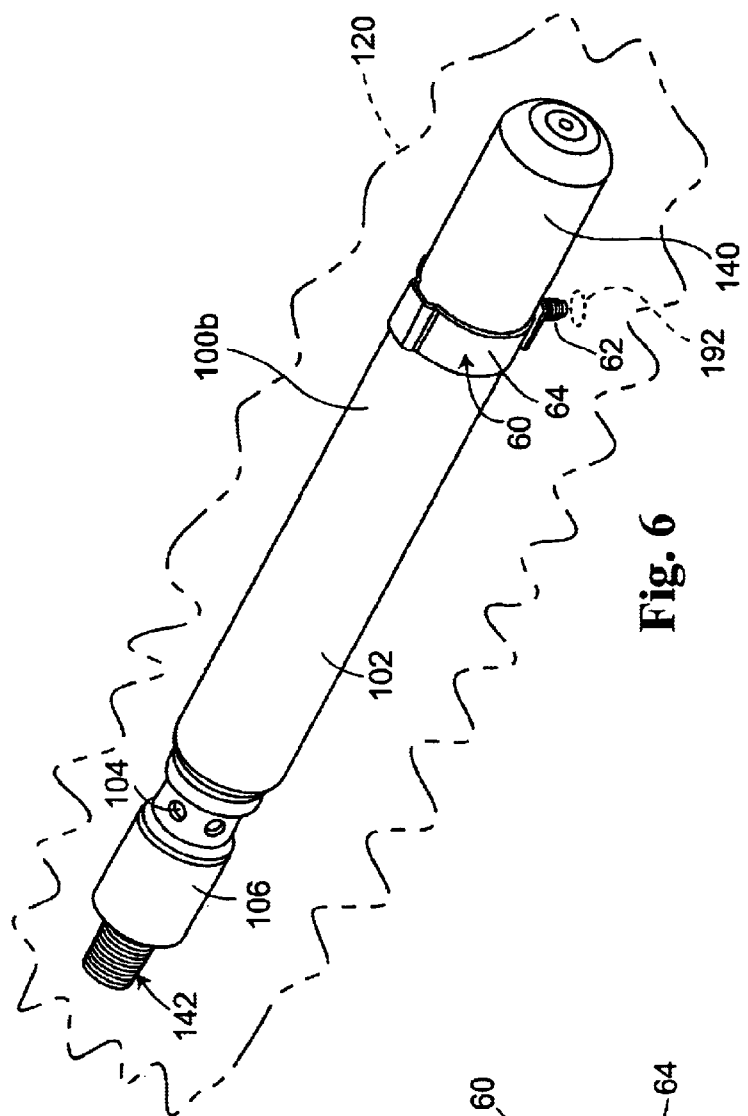
FIG. 6 shows a clamp positioned about the inflator.
Figure 5:
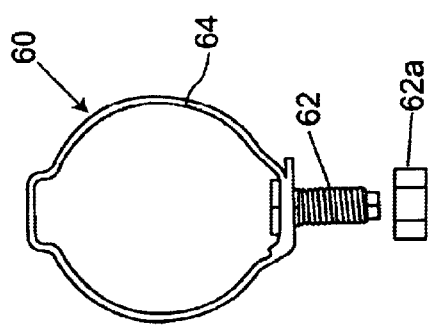
FIG. 5 shows a clamp or fastener for the inflator.

As mentioned, each inflator 100a and 100b includes a threaded portion 142. which is used to mount the inflator to the housing 130. The mounting threaded portion 142 is hollow and envelops an electrical connector 143, which is connected to the initiator of the energetics portion 106. Electrical signals to and from each inflator are by means of a mating connector 145 and wire(s) 147. As also mentioned, inflator 100b is mounted to the housing 130 with the use of an ear clamp, which is shown in FIG. 5. The ear clamp 60 includes a threaded stud 62 and a deformable wire portion or sleeve 64. The ear clamp 60 is slid about the body 102 of the inflator and a wire portion 64 is crimped tightly about the exterior of the inflator as illustrated in FIG. 6.

It should be appreciated that the opposing mounting configuration can be achieved without the use of a discrete housing such as 130. For example, the housing can be replaced by another support member, which may include a portion of the vehicle seat frame or body frame and the like.

With the inflator mounted as shown above, the energetics portion 106 of each inflator is physically, electrically and thermally isolated from each other. This placement reduces the possibility of a spurious ignition of one of the inflators when the other inflator is ignited. In the preferred embodiment the size and capacity of each inflator is equal but they can be different. Additionally, the inflators can be activated simultaneously or with a predetermined time delay.

In view of the opposing placement of the exit ports of each inflator and when both inflators are activated, inflation gas will enter the neck of the air bag in a more uniform manner, which obviates the need for a manifold. The housing/inflator combination of FIG. 2 can be inserted within the neck of an air bag in a conventional manner. Alternately, and as described below, the inflators can be inserted within the neck of an air bag and then secured to the housing.

Figure 7:
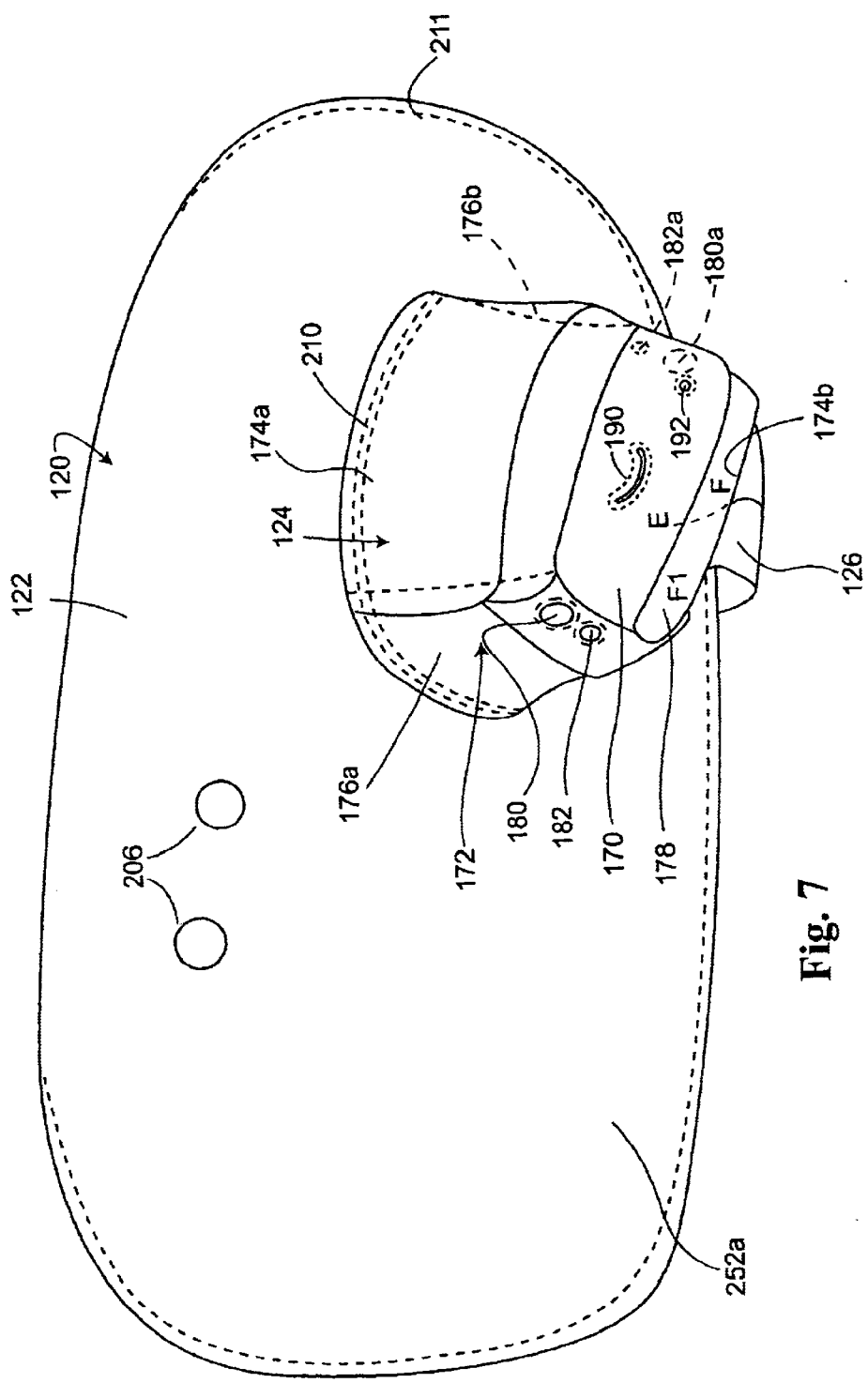
FIG. 7 shows an almost completed air bag turned inside out.
Figure 9:
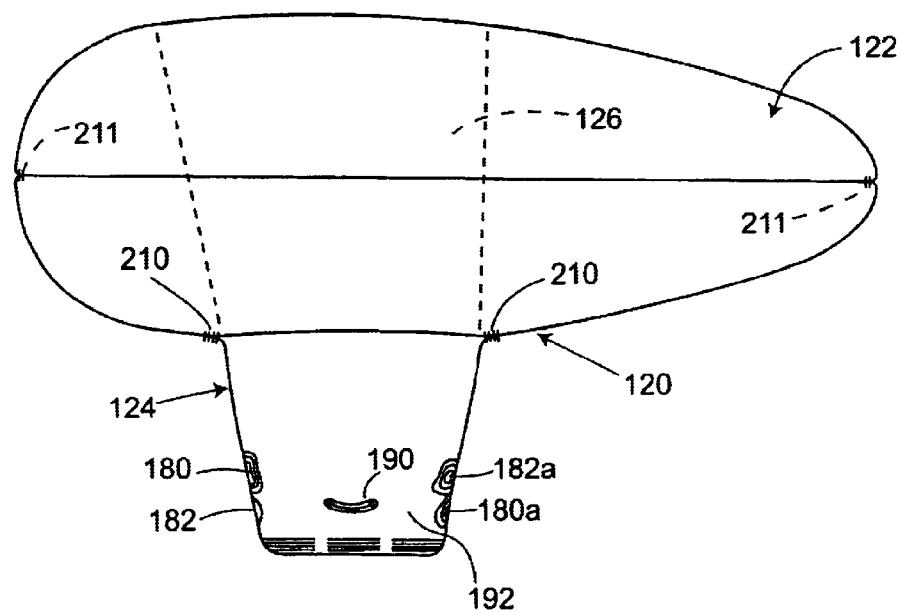
FIG. 9 shows a fully assembled air bag.

FIG. 7 shows an air bag 120 that has been turned inside out, however, it will generally have the same configuration when turned right-side-out (see FIG. 9). The air bag 120 includes an inflatable cushion main portion 122 with a generally enclosed, tube-like neck assembly 124 secured thereto. An optional tether 126 can extend from the neck assembly 124 to the cushion portion 122. In the preferred embodiment of the invention the tether and neck assembly can be fabricated from a single piece of fabric, which can then be reinforced with other fabric panel sections as needed.

Figure 8:
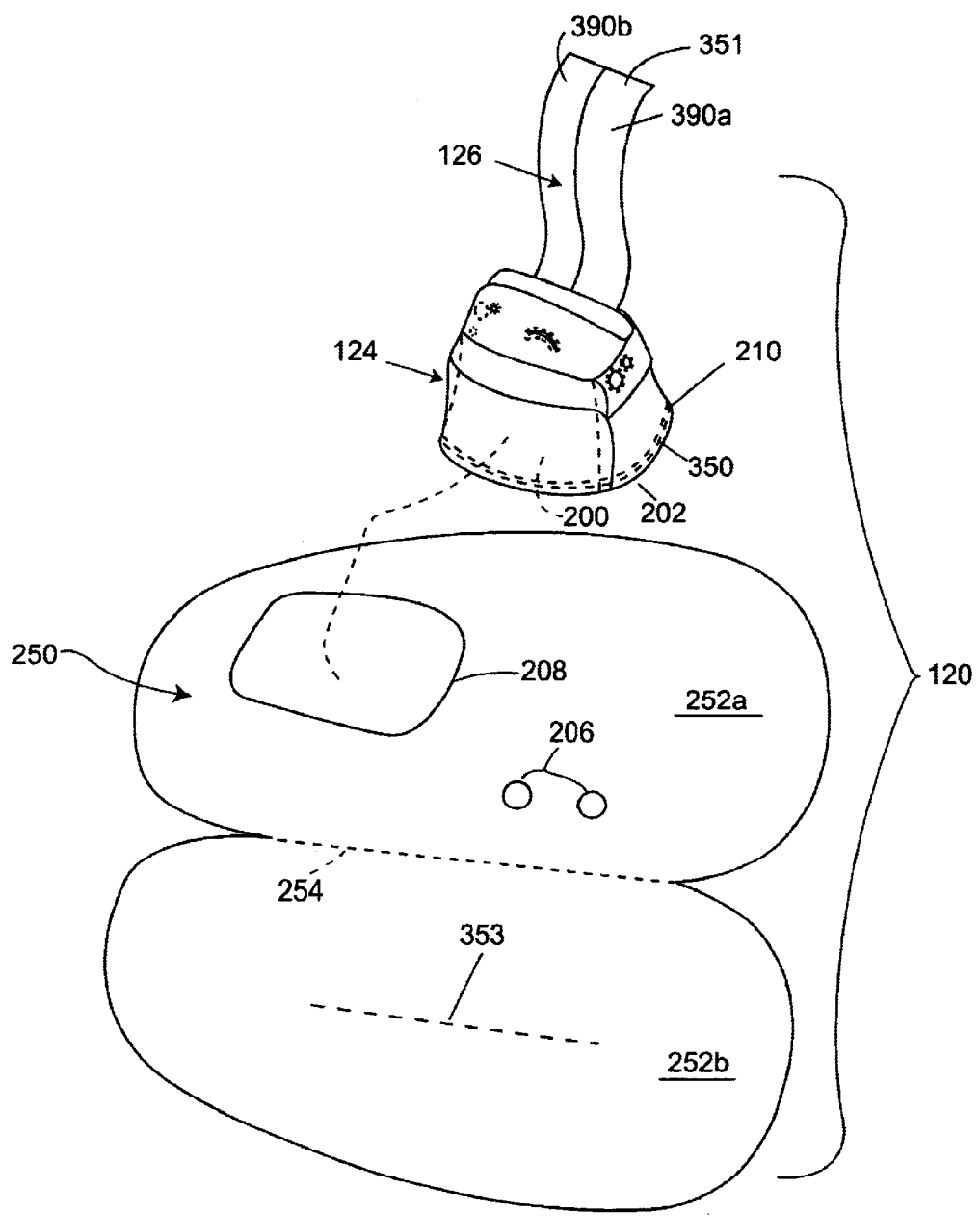
FIG. 8 shows a main panel of the air bag with the neck portion displaced from the main panel.

FIG. 8 shows a partially constructed air bag 120 With a main pane 250 laid flat and with a previously constructed neck assembly 124 displaced from the main panel 250 for the purpose of illustration. The main panel 250 includes panel halves (or panels) 252a and 252b. The panel halves can be generally identical in shape and may be folded about a fold line 254 and sewn about the periphery to form the cushion portion 122 of the air bag. As can be appreciated, each panel 252a and 252b can be a separate piece of material. Panel 252b forms the face panel of the air bag while panel 252a forms the rear panel. Panel 252b includes a marked line or location 353, which identifies the desired location at which the tether 126, if used, is sewn to the face panel 252b. The rear panel 252a includes a plurality of vent holes 206 and a large, oblong opening 208, the perimeter of which is equal to the perimeter of the neck assembly 124. The neck assembly 124 is sewn to the rear panel along seam 210 to achieve the configuration of FIG. 7. The panel halves are sewn along seam 211.

In the preferred embodiment, the neck portion or assembly 124 resembles a truncated pyramid having an end or bottom 170 and a wall 172, which extends from the bottom 170. The wall 172 can have discrete sides or be conically or cylindrically shaped. The resultant shape defined by the end or ends of the wall 172 will conform to the shape of the opening 208 in the panel 252a. In the illustrated embodiment the wall 172 includes two sets of opposed sides 174a,b and 176a,b. Additionally, bottom 170 is shown separated from side 174b, this separation shown by opening 178, which is subsequently closed after the bag is turned right-side-out. The side 176a includes openings 180 and 182 that correspond to end are aligned with the openings 136 and 138a in the end flanges 134a of the housing 130. Additionally, side 176b also has a set of openings 180a and 182a. Opening 182a corresponds to opening 138 of housing 130 and a larger opening 180a has a diameter equal to the diameter of slot 144. Returning briefly to the opening 178, its main purpose is to provide a convenient way to reverse the air bag. After the air bag is pulled right-side-out (see FIG. 9) this opening is closed.

As can also be seen, the bottom or end 170 of the neck or neck portion 124 includes a small slit 190, which serves as an assembly aid. In the illustrated embodiment this slit is arcuately shaped. Additionally the bottom includes a small circular opening 192. The specific construction of the air bag 120 will be described below. Suffice it to say the neck portion 124 can be made as a cylindrical, conical or trapezoidal shape with an opened end or mouth 200 that is secured to a complementarily shaped opening 208 in panel 252a.

Figure 10C:
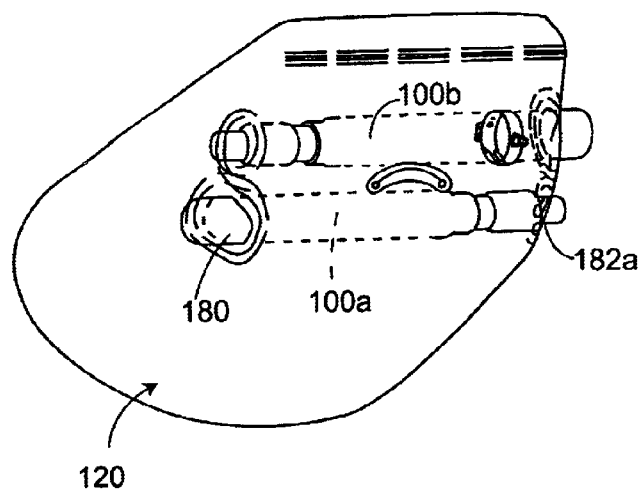
FIGS. 10a–c show intermediate steps in the assembly of a module.
Figure 10A:
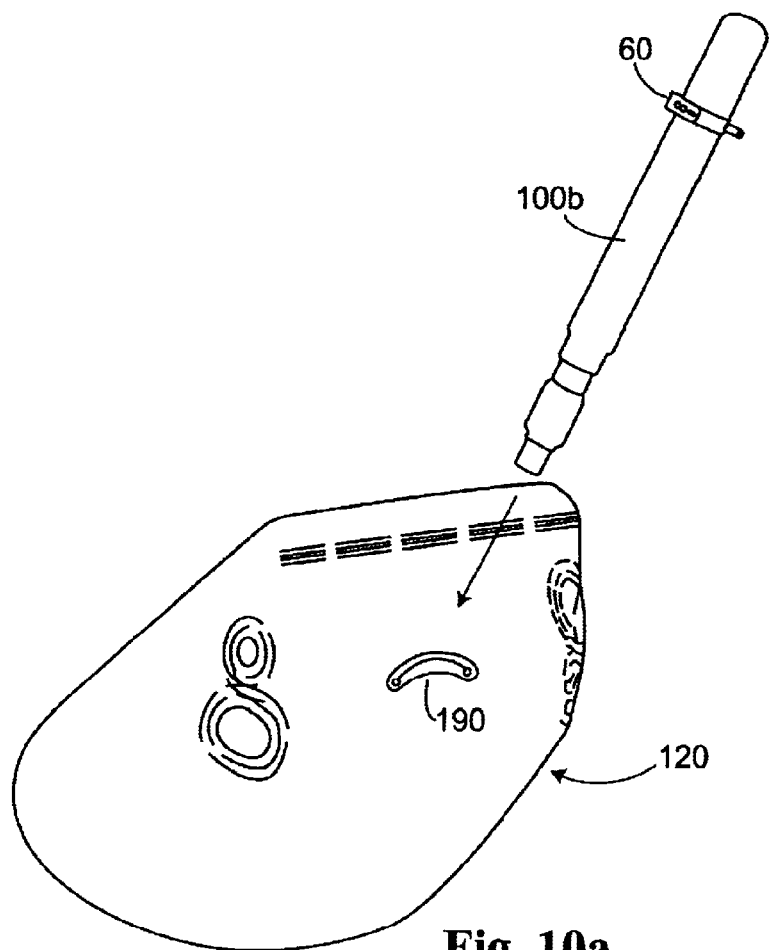
Figure 10B:
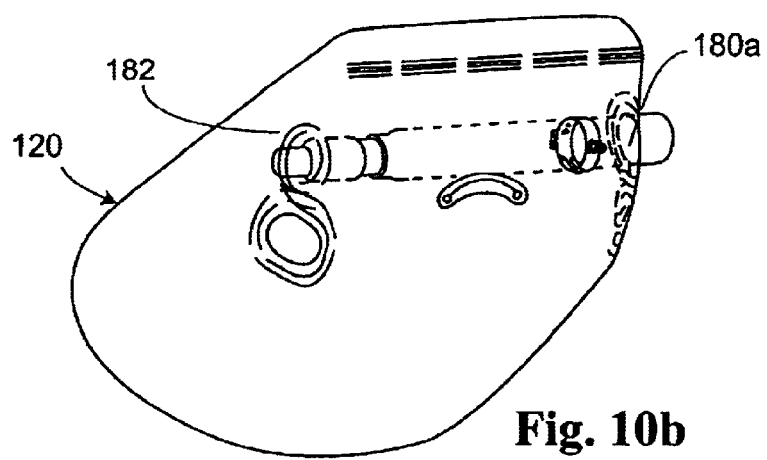

During the assembly of the module 121, a first of the inflators such as 100b is inserted within a completed air bag (as shown in FIGS. 9 and 10a). Inflator 100b includes the clamp 60. The inflator 100b is inserted within the bottom 170 of the air bag through the slit 190 and manipulated such that the fastener end 142 extends through opening 182a and its larger end 140 extends through opening 180a of the air bag. The stud 62 of the clamp is positioned through the small opening 192 in the bottom 170 of the air bag 120 (see FIG. 10b). Thereafter, inflator 100a is inserted through the slit 190 in the neck 124. The inflator 100a is manipulated so that its threaded stud portion 142 extends out of the narrow opening 182a and the larger end 140 extends out of opening 180a.

Figure 11:
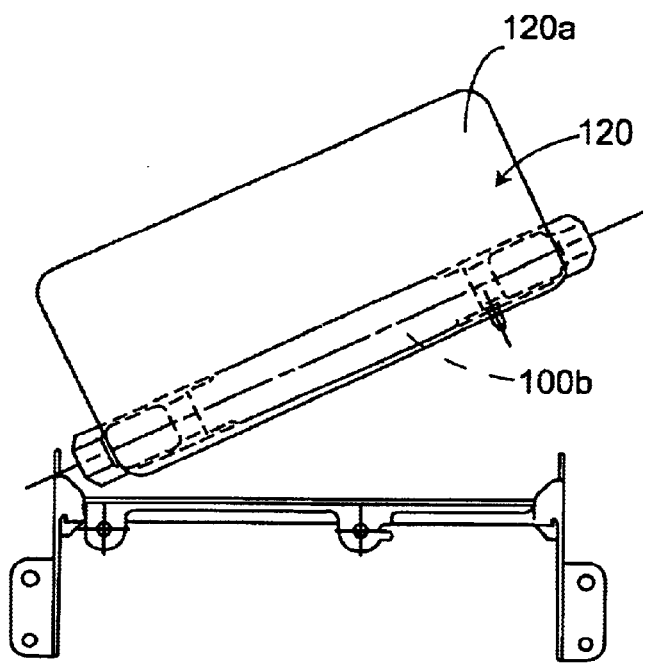
FIG. 11 shows the inflators being assembled to the housing.

Thereafter, the air bag 120 (with the two inflators 100a and 100b in the neck portion 124 and with the respective ends of each inflator extending out of a respective opening)

is positioned adjacent the housing 130 and the inflators Inserted within the openings in the respective flanges 134a and 134b so that the inflators 100a and 100b take the configuration shown in FIG. 2. The inflators (extending from the air bag 120) can individually be inserted within the housing openings or where possible inserted simultaneously in their respective openings in the flange 134a. While the assembly steps may vary, these steps will include the following procedures. For example, the inflators 100a and 100b (and the air bag 120) can be positioned relative to the housing 130 as shown in FIG. It In this elevated position the large end of inflator 100a and the small end of Inflator 100b are inserted in openings 136 and 138a respectively. As an aside, the air bag 120 can be loose and unfolded at this time or folded upon the inflators in a folded air bag pack 120a (which is diagrammatically illustrated in FIG. 11). Returning to insertion process, the inflators after being positioned within the openings 136 and 138a are lowered onto the plate portion 132 of the housing. As the inflators are lowered, the stud 62 of clamp 60 enters into housing opening 152. Thereafter inflator 100a is slid sideways so that its small diameter end 142 enters opening 138 in flange 134b. The inflators and clamp are secured to the housing with their respective fasteners 150 and 62a. If the air bag 120 was not previously folded it can now be folded into the fold pack 120a and placed atop the inflators 100a and 100b and the fold pack secured to the inflators and housing 130 by a band of tearable material 125 such as Tyvek®.

As can be appreciated, since the exit ports of the two inflators 100a and 100b are symmetrically located relative to the axis of symmetry of the housing, a manifold is no longer needed to distribute the inflation gasses into the neck 124. Additionally and as previously mentioned, by positioning the energetics portion of each inflator remote from the other, the heat from one does not impact the operation of the other. Additionally, since each inflator extends completely through the air bag, upon inflation, the reaction load is taken by the inflator's themselves as the inflators reacts against the housing 130.

As mentioned the air bag 120 can include the tether 126. The tether 126 can be a separate piece of material (typically air bag material), which is sewn to the neck assembly 124 (and then to the panel 252a) or as described below, the tether 126 can be an integral portion of the neck assembly 124.

The neck assembly 124 can be made from three pieces of fabric. These pieces are: a neck or outer panel 350, an inner or intermediate panel 352 and a heat shield 354. The heat shield and the intermediate panel are each aligned to the outer panel 350 and sewn thereto. The outer panel 350 (with the other panels thereon) is formed into the assembly 124 with the integral tether 126. If the neck panel 350 is sufficiently robust, the intermediate panel and the heat shield can be eliminated. While not mentioned previously, the main panel 350, and the intermediate panel can be made from either a silicon coated or uncoated, woven nylon fabric and the heat shield can be made from a woven, nylon fabric heavily coated in silicon.

Figure 12:
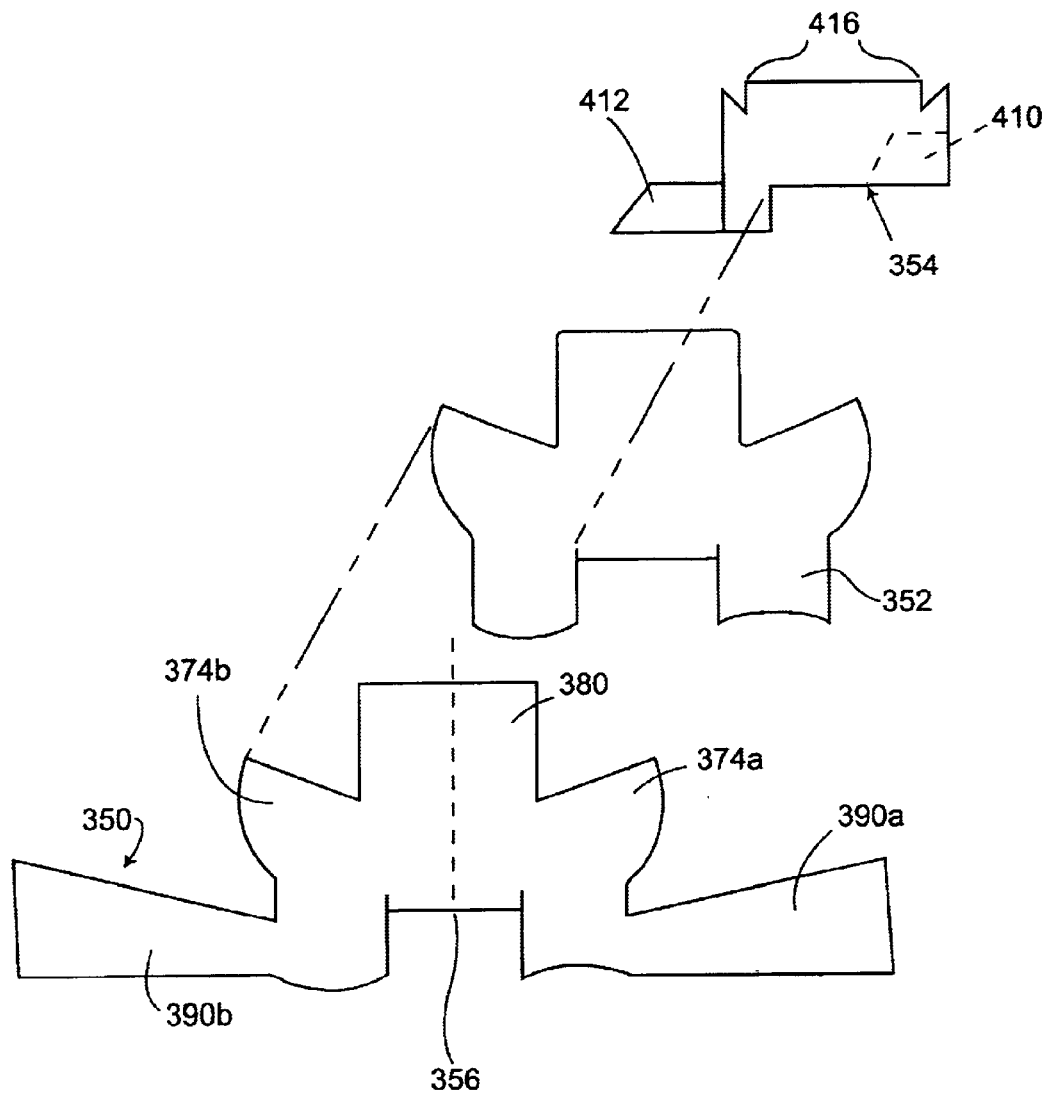
FIG. 12 illustrates the panels of material used to form the neck assembly.

As can be seen from FIG. 12, the neck outer panel 350 is symmetric about a centerline 356 having a first curved side portion 374a and a second curved side portion 374b. These two side portions will form the short sides of the neck assembly 124 (see FIG. 7). The panel 350 includes an extending rectangular member 380, which will form the bottom of the neck assembly. Extending respectively from each of the side portions 374a and b are complementary tether flaps 390a and 390b.

Figure 13:
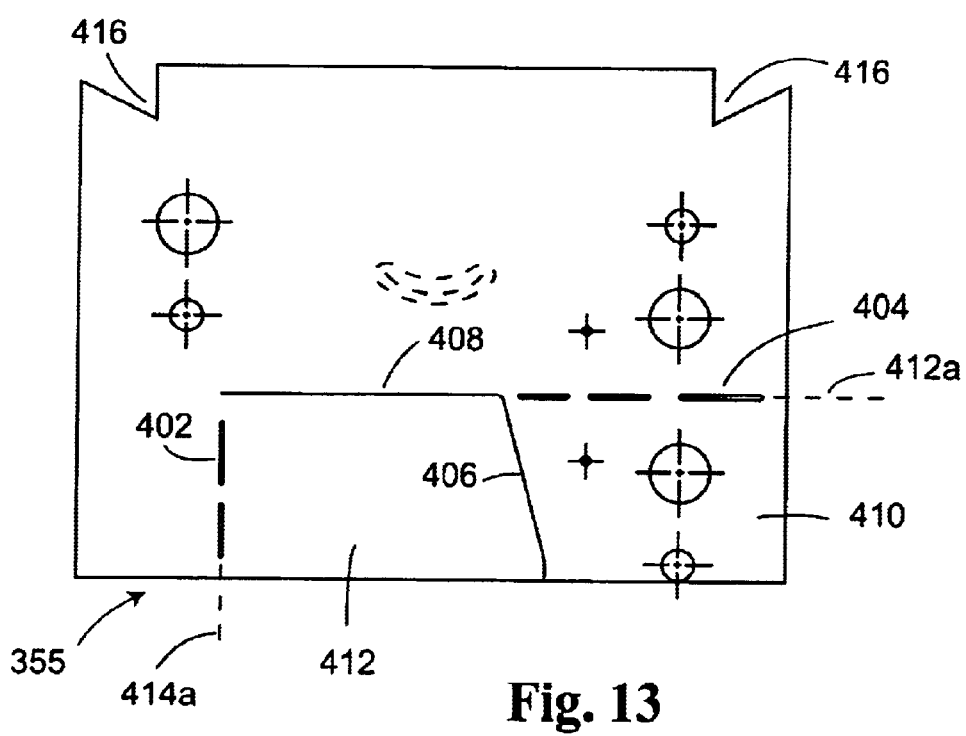
FIG. 13 shows the heat shield before it is assembled.

The heat shield 354 shown in FIG. 12 is the result of a number of secondary operations. The heat shield 354 is first formed from a generally rectangular panel 355, which is shown in FIG. 13. This panel is cut and manipulated to the shape shown in FIG. 12. The heat shield 354, or more particularly the panel 355, includes a plurality of slots or openings 402 and 404, which also form or lie upon or define respective fold lines 414a and 412a. Since the heat shield is made from a coated fabric, it is somewhat stiff and the openings 402 and 404 make it easier to fold the flaps 410 and 412 along their respective fold lines. The heat shield 354 is cut along two intersecting cut lines 406 and 408. That portion of the panel 355 below openings 404 form a flap 410, which is folded (along fold line 412a) backwardly (see FIG. 12) and placed under the main part of the panel 355. The culling of panel 355 as mentioned above also forms a second flap 412. This second flap 412 is folded back along a fold line 414a. FIG. 12 shows the heat shield 354 with the flaps 410 and 412 in their folded-back positions. The top portion of the heat shield additionally includes narrow cutouts or notches 416, the purpose of which will be seen below, As a general note, each of the panels 350, 352, 354, 355 is sometimes shown with and without openings. This is to illustrate that these openings can be made before or after they are sewn together. The heat shield 354, or more particularly the panel 355, includes a plurality of slots or openings 402 and 404, which also form or lie upon or define respective fold lines 414a and 412a. Since the heat shield is made from a coated fabric, it is somewhat stiff and the openings 402 and 404 make it easier to fold the flaps 410 and 412 along their respective fold lines. The heat shield 354 is cut along two intersecting cut lines 406 and 408. That portion of the panel 355 below openings 404 form a flap 410, which is folded (along fold line 412a) backwardly (see FIG. 12) and placed under the main part of the panel 355. The cutting of panel 355 as mentioned above also forms a second flap 412. This second flap 412 is folded back along a fold line 414. FIG. 12 shows the heat shield 354 with the flaps 410 and 412 in their folded-back positions. The top portion of the heat shield additionally includes narrow cutouts or notches 416, the purpose of which will be seen below. As a general note, each of the panels 350, 352, 354, 355 is sometimes shown with and without openings. This is to illustrate that these openings can be made before or after they are sewn together.

While FIG. 12 shows the use of the inner panel and the heat shield, neither is a requirement of the invention. As the neck or throat assembly 124 is in close proximity to the heated gasses produced by the various inflators 100a and 100b, it may also be desirable to add an intermediate or inner panel 352 as part of the neck portion or assembly 124 if needed.

Figure 14:
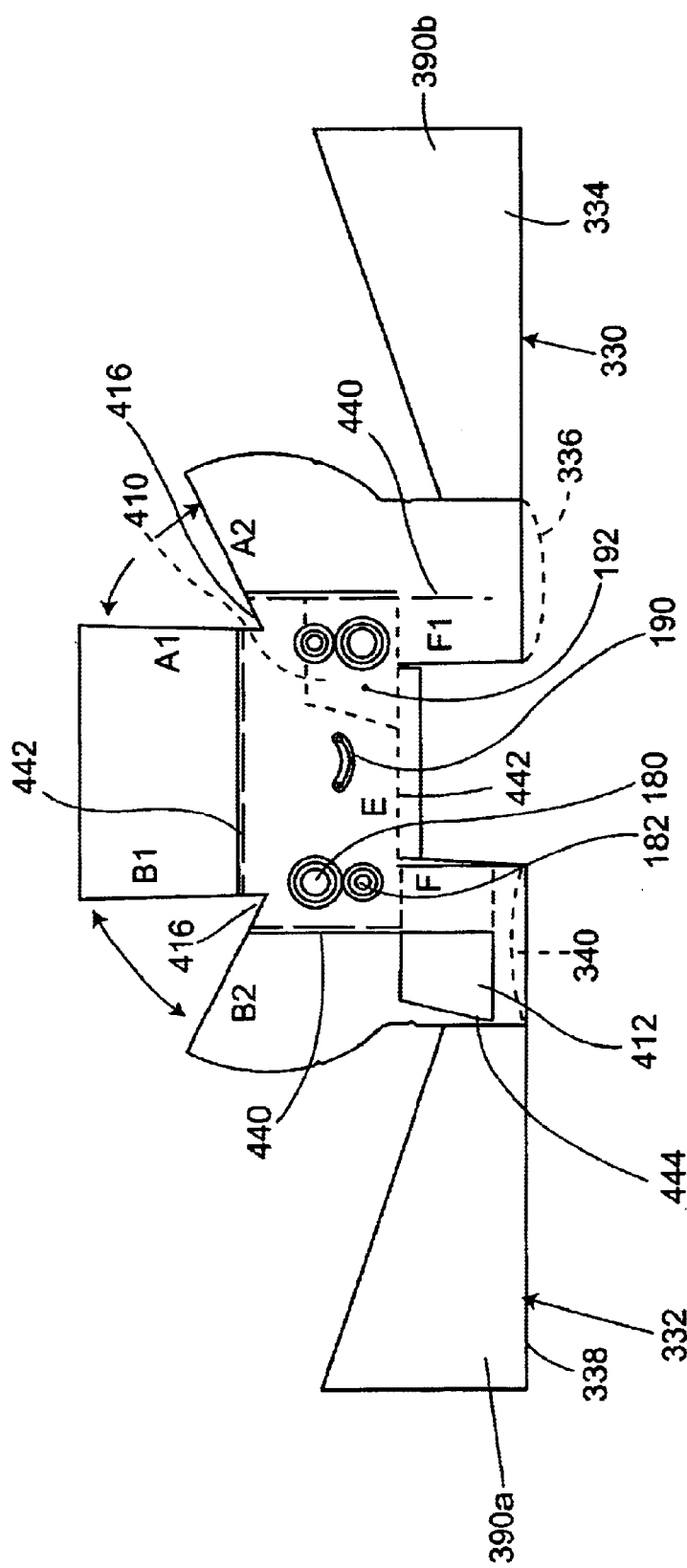
FIG. 14 shows another view of panels used in the neck assembly.

Reference is made to FIG. 14. This figure shows the heat shield 354 and the intermediate panel 352 placed upon and aligned to the outer panel 350. These panels are then sewn together along seams 440, 442, 444. Thereafter, the various openings 180, 180a, 182, 182a, 190 and 192 can be cut, stamped or burned into the various panel members 350, 352 and 354 and added seams sewn about these openings to further secure the panels together. The seams provided about the openings in the air bag for the inflators provide reinforcement to limit deformation of the material about these openings during deployment.

The following procedure defines the steps needed to sew the various opposing sides of the outer panel 350 (with the inner panel and heat shield in place) to form the neck assembly 124. Sides A1 and A2 are moved together and sewn to each other. Similarly, sides B1 and B2 are sewn together. Reference is made to the lower edges 330 and 332 of tether flaps 390a and 390b. Edge 330 includes a flat portion 334 and a convex portion 336. Similarly edge 332 includes a flat portion 338 and an optional concave portion 340. The lower edges 330 and 332 are moved together with the concave and convex portions aligned and the straight portions mated and these edges sewn together. This step forms the integral tether 126. When the edges 330 and 332 are moved and sewn together it will position edges F and F1 opposite the larger edge E (these edges are shown in FIG. 14). These edges F, F1 and E form the opening 178 through which the bag is turned inside out. Subsequently, the neck assembly 124, at its periphery 202, is joined to the rear panel 252a at a sew seam 210. Thereafter, the extending end 351 of the sewn-together flaps 390a and 300b (which together form the tamer 126), is secured to the face panel at a desired location, generally designated as 353.

Figure 15:
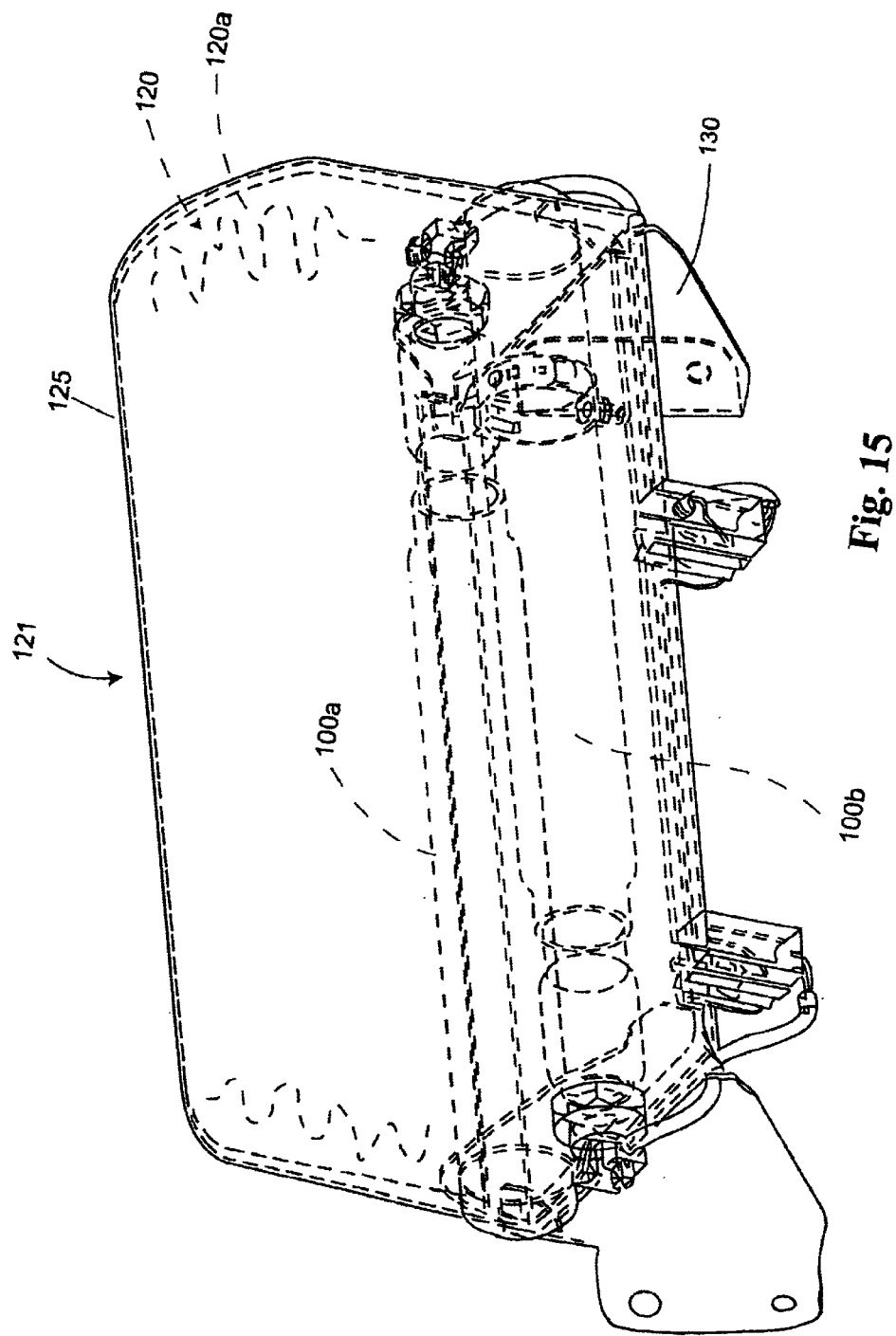
FIG. 15 shows an assembled air bag module.

Subsequently, the panel halves 252a and 252b are folded over at the centerline and sewn along a peripheral seam 211 to achieve the configuration shown in FIG. 7. After the peripheral seam 211 is formed, the air bag is turned inside out through opening 178 (formed by edges or sides F, F1 and E). This opening 178 is sewn closed, giving the bag 120 its final shape as shown in FIG. 9. FIG. 15 shows an assembled air bag module 121.

Many changes and modifications in the above-described embodiment of the invention can, of course, be carried out without departing from the scope thereof. Accordingly, that scope is intended to be limited only by the scope of the appended claims.

What is claimed is:

1. An air bag system comprising:

a housing, an air bag and a plurality of inflators;

each inflator having a cylindrical shape with a first end and a second end, at least one exit port located near the first end of each inflator;

the air bag configured to receive the inflators prior to attachment of the inflators or air bag to the housing; the inflators arranged, within the air bag, relative to one another, with the at least one exit port of a first one of the inflators positioned adjacent the second end of a second one of the inflators and with the second end of the first inflator adjacent the exit port of the second inflator;

the housing further including first means for mounting the air bag with the inflators therein.

2. The system as defined in claim 1, wherein the mounting means includes a set of opposing first and second end flanges with each end flange including mounting features to receive respective ends of the first and second inflators.

3. The system as defined in claim 2 wherein the mounting means includes a center portion connecting the end flanges, the center portion reacting against forces of inflation.

4. The system as defined in claim 3 wherein the center portion is flat.

5. The system as defined in claim 2 wherein each inflator includes a cylindrically shaped, threaded first end and wherein one of the end flanges includes an opening to receive the second end of the first inflator and the other end flange includes an opposite opening to receive the first end of the first inflator.

6. The system as defined in claim 5 wherein the flange having the opening to receive the second end of the first inflator also includes another opening to receive the first end of the second inflator and wherein the other flange having the opening to receive the first end of the first inflator includes a semi-circular groove upon which the second end of the second inflator rests.

7. The system as defined in claim 6 wherein the second inflator further includes a clamp to operatively fix the second end of the second inflator to the mounting means.

8. The system as defined in claim 2 wherein the first end of each inflator is fastened to the mounting means via a through connection.

9. The system as defined in claim 1, wherein the air bag includes a neck portion and a cushion portion, the neck portion mountable to the housing by the inflators.

10. The system as defined in claim 9 wherein the first and the second inflators are received within the neck portion with their respective ends extending therefrom and wherein the mounting means is external from the air bag.

11. The system as defined in claim 9 wherein the neck portion includes opposing neck sides, each side with a set of openings to receive a respective end of each inflator.

12. The system as defined in claim 11 wherein the neck portion includes a bottom portion joining the neck sides and wherein the bottom portion, on assembly, is located between the inflators and a center portion of the mounting means.

13. The system as defined in claim 12 wherein the bottom portion of the neck portion includes an opening to receive a clamp that extends from one of the inflators through the center portion of the mounting means.

14. The system as defined in claim 1 wherein the air bag includes a neck assembly secured to a main panel, the neck assembly including a tether, the tether formed of the same material forming the neck assembly.

* * * * *